United States Patent
Koda et al.

(10) Patent No.: US 10,784,051 B2
(45) Date of Patent: Sep. 22, 2020

(54) DYE-SENSITIZED PHOTOELECTRIC CONVERSION ELEMENT

(71) Applicant: NSK LTD., Tokyo (JP)

(72) Inventors: Atsumi Koda, Fujisawa (JP); Yuki Ishioka, Fujisawa (JP); Junichi Shikuma, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/632,227

(22) PCT Filed: Jul. 20, 2018

(86) PCT No.: PCT/JP2018/027284
§ 371 (c)(1),
(2) Date: Jan. 17, 2020

(87) PCT Pub. No.: WO2019/017473
PCT Pub. Date: Jan. 24, 2019

(65) Prior Publication Data
US 2020/0211787 A1 Jul. 2, 2020

(30) Foreign Application Priority Data

Jul. 21, 2017 (JP) ................................. 2017-141854
Jun. 12, 2018 (JP) ................................. 2018-112220

(51) Int. Cl.
*H01G 9/20* (2006.01)

(52) U.S. Cl.
CPC ......... *H01G 9/2013* (2013.01); *H01G 9/2059* (2013.01)

(58) Field of Classification Search
CPC ........................... H01G 9/2013; H01G 9/2059
USPC ......................................................... 136/253
See application file for complete search history.

(56) References Cited

U.S. PATENT DOCUMENTS

| | | | |
|---|---|---|---|
| 2011/0041915 A1 | 2/2011 | Miyasaka et al. | |
| 2014/0299190 A1* | 10/2014 | Eom ................... | H01G 9/2013 136/263 |
| 2015/0129035 A1 | 5/2015 | Miyasaka et al. | |

(Continued)

FOREIGN PATENT DOCUMENTS

| | | |
|---|---|---|
| JP | 2008-027860 A | 2/2008 |
| JP | 2012-117010 A | 6/2012 |
| JP | 2012-156096 A | 8/2012 |

(Continued)

OTHER PUBLICATIONS

International Search Report (PCT/ISA/210) dated Sep. 18, 2019 issued by the International Searching Authority in International Application No. PCT/JP2018/027284.

(Continued)

*Primary Examiner* — Magali P Slawski
*Assistant Examiner* — Kourtney R S Carlson
(74) *Attorney, Agent, or Firm* — Sughrue Mion, PLLC

(57) ABSTRACT

The dye-sensitized photoelectric conversion element of the present invention has an electrolyte layer in which an ammonium ion, an inorganic salt and an iodide ion are dissolved in an organic solvent and in which the ratio of the molar amount of triiodide ions to the molar amount of iodide ions is less than 1%. High photoelectric conversion efficiency is obtained regardless of the kind of the sensitizing dye, and the design is also excellent.

8 Claims, 2 Drawing Sheets

(56) References Cited

U.S. PATENT DOCUMENTS

2016/0276609 A1* 9/2016 Horiuchi ............... H01L 51/442

FOREIGN PATENT DOCUMENTS

| JP | 5479327 B2 | 4/2014 |
|----|------------|--------|
| WO | 2009133806 A1 | 11/2009 |

OTHER PUBLICATIONS

Written Opinion (PCT/ISA/237) dated Sep. 18, 2019 issued by the International Searching Authority in International Application No. PCT/JP2018/027284.

* cited by examiner

DYE-SENSITIZED PHOTOELECTRIC CONVERSION ELEMENT

TECHNICAL FIELD

The present invention relates to a dye-sensitized photoelectric conversion element.

BACKGROUND ART

Recently, as a photoelectric conversion element that converts solar energy into electric power, a solid pn junction solar cell has been actively studied. A solid junction solar cell uses a silicon crystal, an amorphous silicon thin film, or a multilayer thin film of a non-silicon compound semiconductor.

However, the solid junction solar cell needs to be manufactured at high temperature or under vacuum. Thus, the manufacture of the solid junction solar cell has disadvantages that plant costs increase and energy payback time becomes long.

For a next-generation solar cell, development of an organic solar cell that can be manufactured at a low temperature and at a lower cost has been expected. Among organic solar cells, a dye-sensitized solar cell capable of being mass-produced at a low cost in the atmosphere has particularly been attracting attention.

The dye-sensitized solar cell is a wet solar cell that employs a solid (semiconductor)-liquid (electrolytic solution) junction instead of a solid (semiconductor)-solid (semiconductor) junction in the solid junction solar cell. The dye-sensitized solar cell exhibits such a high energy conversion efficiency as 11% and is promising as a source of electric energy.

The electrolytic solution to be used for the dye-sensitized solar cell is generally a solution in which redox couples and an electrolyte are dissolved in an organic solvent.

As the organic solvent, aprotic polar substances (e.g., carbonates, ethers, lactones, nitriles, sulfoxides) are generally used. As the redox couple, iodine and an iodide, bromine and a bromide, a ferrocyanate salt and a ferricyanate salt, and a ferrocene and a ferricinium ion have been proposed. However, from the viewpoint of photoelectric conversion efficiency, a combination of iodine (a triiodide ion in a solution) and an iodide (an iodide ion in a solution) is common. A typical electrolyte is a salt of quaternary ammonium (including a cyclic ion such as a pyridinium ion or an imidazolium ion) (a counter ion thereof is generally an iodide ion).

However, in the iodine-iodide redox couples, there is a problem that the electrolytic solution becomes brown due to iodine, the color of a sensitizing dye is not sufficiently reflected, and thus the design is inferior. Accordingly, Patent Document 1 proposes a dye-sensitized photoelectric conversion element using an electrolytic solution in which specific amounts of an aliphatic quaternary ammonium ion, an imidazolium ion, and an iodide ion are contained in an organic solvent and the ratio of the molar amount of triiodide ions to the molar amount of iodide ions is regulated to less than 1% such that a high photoelectric conversion efficiency is obtained even when the amount of iodine to be added is reduced.

BACKGROUND ART

Patent Document

Patent Document 1: Japanese Patent Publication No. 5479327

SUMMARY OF INVENTION

Problems to be Solved by the Invention

Even though the dye-sensitized photoelectric conversion element described in Patent Document 1 has a low content of iodine, high photoelectric conversion efficiency is obtained. However, when the present inventors have performed verification thereof, it has been found that sufficient photoelectric conversion efficiency is not obtained in the cases of a part of sensitizing dyes as shown in Test Examples to be described later. Accordingly, an object of the present invention is to provide a dye-sensitized photoelectric conversion element that exhibits high photoelectric conversion efficiency and also has an excellent design, regardless of the kind of the sensitizing dye.

Means for Solving the Problems

In order to solve the above problem, the present invention provides the following dye-sensitized photoelectric conversion element.

(1) A dye-sensitized photoelectric conversion element comprising in this order, a porous semiconductor electrode comprising dye-sensitized semiconductor particles, an electrolyte layer and a counter electrode, wherein the electrolyte layer is an electrolytic solution in which an ammonium ion represented by the following formula (I), an inorganic salt, and an iodide ion are dissolved in an organic solvent and the ratio of the molar amount of triiodide ions to the molar amount of iodide ions is less than 1%,

[Chem 1]

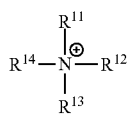

(I)

wherein $R^{11}$ to $R^{14}$ are a hydrogen atom, an alkyl group or an aryl group, and may be the same or different from each other.

(2) The dye-sensitized photoelectric conversion element according to the above (1), wherein the inorganic salt is a halide of an alkali metal or an alkali metal perchlorate.

(3) The dye-sensitized photoelectric conversion element according to the above (2), wherein the inorganic salt is a lithium salt.

(4) The dye-sensitized photoelectric conversion element according to any one of the above (1) to (3), wherein the electrolytic solution contains a guanidinium ion and a thiocyanate ion or a halide ion.

(5) The dye-sensitized photoelectric conversion element according to any one of the above (1) to (4), wherein the concentration of the ammonium ion in the electrolytic solution is 0.05 to 5M, the concentration of the inorganic salt is 0.05 to 5M, and the concentration of the iodide ion is 0.1 to 10M.

(6) The dye-sensitized photoelectric conversion element according to any one of the above (1) to (5), wherein the electrolytic solution contains a reducing agent.

(7) The dye-sensitized photoelectric conversion element according to the above (6), wherein the reducing agent is sodium thiosulfate.

(8) A dye-sensitized photoelectric conversion element comprising in this order, a porous semiconductor electrode comprising dye-sensitized semiconductor particles, an electrolyte layer and a counter electrode, wherein the electrolyte layer is a gel electrolyte comprising an onium salt of a crosslinking agent represented by the following general formula and poly(4-vinylpyridine), and the electrolytic solution according to any one of the above (1) to (7),

[Chem 2]

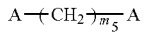
(5)

wherein $m_5$ is an integer of 1 to 30 and A is the following formula (A); in the formula (A), each $R^1$ is independently a fluoro group or an alkyl group or aryl group having a fluoro group, and the alkyl group or the aryl group may have a substituent.

[Chem 3]

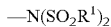
(A)

Effects of the Invention

When the present inventors have investigated various compositions of the electrolytic solution, they have found that there is a specific composition that affords high photoelectric conversion efficiency even when the amount of iodine to be added to the electrolytic solution is significantly reduced.

The specific composition is a composition in which an ammonium ion, an inorganic salt, and an iodide ion are dissolved as electrolytes in an organic solvent, as described above. In an electrolytic solution in which an iodide ion is dissolved, the presence of the triiodide ion constituting a redox couple with the iodide ion (in other words, addition of iodine to the electrolytic solution) has been considered essential. However, only in the case where the above-described specific electrolytes are combined, high photoelectric conversion efficiency can be maintained even when the amount of iodine to be added is significantly reduced.

According to the investigation by the present inventors, it is thought that electrons are transmitted by an electron exchange reaction between iodide ions ($I^-$) even in a situation where redox couples are not formed (no triiodide ion exists) and electron transfer occurs in the electrolytic solution. However, the occurrence of the electron transfer between iodide ions is limited to the case where specific electrolytes are combined and a plurality of electrolytes that facilitate the electron transfer between iodide ions are used in combination, unlike the case where redox couples exist.

When the composition of the electrolytic solution according to the present invention is employed, the amount of iodine to be added to the electrolytic solution can be greatly reduced. Thereby, coloring of the electrolyte solution resulting from the triiodide ion is decreased and transparency of the electrolyte solution can be remarkably improved. As a result, high photoelectric conversion efficiency can be maintained, and further, the color of the sensitizing dye can be reflected.

Moreover, since iodine is corrosive, it has been difficult to use a metal that is easily corroded by iodine as a conductive layer of a semiconductor electrode or a counter electrode layer. When the amount of iodine to be added to the electrolytic solution is greatly reduced according to the present invention, a metal having low resistance and low voltage loss can be used as the conductive layer of the semiconductor electrode or the counter electrode layer.

Furthermore, containing an inorganic salt typified by an alkali metal halide or an alkali metal perchlorate can provide high photoelectric conversion efficiency regardless of the sensitizing dye. Since there are no restrictions on the sensitizing dye, more diverse color patterns can be obtained.

Thus, according to the dye-sensitized photoelectric conversion element of the present invention, high photoelectric conversion efficiency can be obtained despite the small amount of iodine in the electrolytic solution. In addition, since a certain level or higher level of excellent photoelectric conversion efficiency is attained regardless of the kind of the sensitizing dye, the element is a dye-sensitized photoelectric conversion element which exhibits more diverse color patterns and has a more excellent design, with no restriction of the sensitizing dye.

Moreover, in the case of the electrolyte layer in which the above electrolyte solution is galled with a specific gelling agent, in addition to high photoelectric conversion efficiency and improved design, stability and durability of the electrolyte layer increase.

EMBODIMENTS FOR CARRYING OUT THE INVENTION

[Electrolytic Solution]

Figure 1:
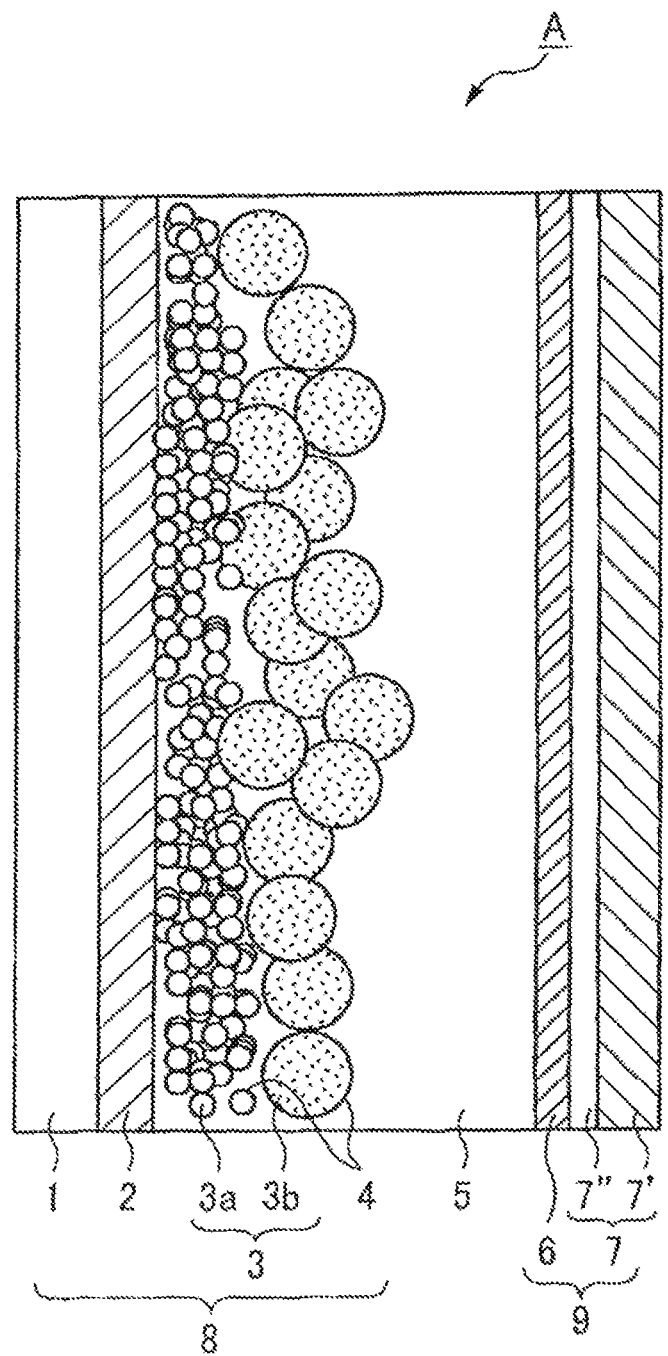
FIG. 1 It is a cross-sectional view showing a structural example of the dye-sensitized photoelectric conversion element according to the present invention.

The present invention is characterized in that the electrolytic solution constituting the electrolyte layer is an electrolytic solution in which an ammonium ion represented by the above formula (I), an inorganic salt, and an iodide ion (I') are dissolved in an organic solvent and the ratio of the molar amount of triiodide ions ($I_3^-$) to the molar amount of iodide ions ($I^-$) (hereinafter referred to as "($I_3^-/I^-$) ratio")) is less than 1%.

The ($I_3^-/I^-$) ratio is more preferably less than 0.1%, further preferably less than 0.01%, and most preferably less than 0.001%. The amount of the triiodide ions (If) may be at a level that is not detected from the electrolytic solution in a normal detection method.

The organic solvent is preferably an aprotic polar substance. Examples of the organic solvent include 5-membered cyclic carbonates, 5-membered cyclic esters, aliphatic nitriles, aliphatic linear ethers, aliphatic cyclic ethers, aliphatic sulfones, cyclic sulfones and aliphatic sulfoxides.

The 5-membered cyclic carbonate is preferably represented by the following formula

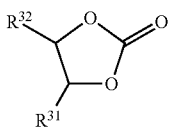
(III)

In the formula (III), $R^{31}$ and $R^{32}$ are each independently a hydrogen atom or an aliphatic group having 1 to 20 carbon atoms. The aliphatic group is preferably an alkyl group. The number of carbon atoms in the aliphatic group is preferably 1 to 12, more preferably 1 to 6, and most preferably 1 to 3.

Examples of the 5-membered cyclic carbonate include ethylene carbonate and propylene carbonate.

The 5-membered cyclic ester is preferably represented by the following formula (VI).

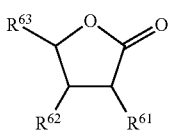
(VI)

In the formula (VI), $R^{61}$, $R^{62}$ and $R^{63}$ are each independently a hydrogen atom or an aliphatic group having 1 to 20 carbon atoms. The aliphatic group is preferably an alkyl group. The number of carbon atoms in the aliphatic group is preferably 1 to 12, more preferably 1 to 6, and most preferably 1 to 3.

Examples of the 5-membered cyclic ester (γ-lactone) include γ-butyrolactone and γ-valerolactone.

The aliphatic nitrile is preferably represented by the following formula (VII).

$$R^7-C\equiv N \qquad (VII)$$

In the formula (VII), $R^{71}$ is an aliphatic group having 1 to 20 carbon atoms. The aliphatic group is preferably an alkyl group or a substituted alkyl group (preferably an alkoxy-substituted alkyl group). The number of carbon atoms in the aliphatic group is preferably 1 to 12, more preferably 1 to 6, and most preferably 1 to 3.

Examples of the aliphatic nitrile include acetonitrile and 3-methoxypropionitrile.

The aliphatic linear ether is preferably represented by the following formula (VIII).

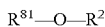
$$R^{81}-O-R^{82} \qquad (VIII)$$

In the formula (VIII), $R^{81}$ and $R^{82}$ are each independently an aliphatic group having 1 to 20 carbon atoms. The aliphatic group is preferably an alkyl group or a substituted alkyl group (preferably an alkoxy-substituted alkyl group). The number of carbon atoms in the aliphatic group is preferably 1 to 12, more preferably 1 to 6, and most preferably 1 to 3. Examples of the aliphatic linear ether include dimethoxyethane.

The aliphatic cyclic ether is preferably represented by the following formula (IX).

(IX)

In the formula (IX), $L^{91}$ is a divalent aliphatic group having 1 to 20 carbon atoms in which an oxygen atom may intervene. $L^{91}$ is preferably an alkylene group or a combination of an alkylene group and an oxygen atom (e.g., -alkylene group-oxygen atom-alkylene group-). The number of carbon atoms in the alkylene group is preferably 1 to 12, more preferably 1 to 6, and most preferably 1 to 4.

Examples of the aliphatic cyclic ether include tetrahydrofuran and dioxane.

The aliphatic sulfone is preferably represented by the following formula (X).

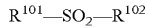
$$R^{101}-SO_2-R^{102} \qquad (X)$$

In the formula (X), $R^{101}$ and $R^{102}$ are each independently an aliphatic group having 1 to 20 carbon atoms. The aliphatic group is preferably an alkyl group or a substituted alkyl group. The number of carbon atoms in the aliphatic group is preferably 1 to 12, more preferably 1 to 6, and most preferably 1 to 3.

Examples of the aliphatic sulfone include ethyl isopropyl sulfone.

The cyclic sulfone is represented by the following formula (Y).

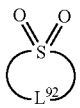
(Y)

In the formula (Y), $L^{92}$ is a divalent aliphatic group having 1 to 20 carbon atoms in which an oxygen atom may intervene. $L^{92}$ is preferably an alkylene group or a combination of an alkylene group and an oxygen atom (e.g., -alkylene group-oxygen atom-alkylene group-). The number of carbon atoms in the alkylene group is preferably 1 to 12, more preferably 1 to 6, and most preferably 1 to 4. Examples of the cyclic sulfones include sulfolane.

The aliphatic sulfoxide is preferably represented by the following formula (Z).

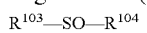
$$R^{103}-SO-R^{104} \qquad (Z)$$

In the formula (Z), $R^{103}$ and $R^{104}$ are each independently an aliphatic group having 1 to 20 carbon atoms. The aliphatic group is preferably an alkyl group or a substituted alkyl group. The number of carbon atoms in the aliphatic group is preferably 1 to 12, more preferably 1 to 6, and most preferably 1 to 3.

Examples of the aliphatic sulfoxide include dimethyl sulfoxide.

Two or more kinds of organic solvents may be used in combination. For example, a 5-membered cyclic carbonate and another organic solvent (e.g., a cyclic ester, an aliphatic nitrile, an aliphatic linear ether, an aliphatic cyclic ether, an aliphatic sulfone, a cyclic sulfone, or an aliphatic sulfoxide) can be used in combination. The combined use of a plurality of solvents has an effect that the viscosity of the solvent can be adjusted (as a result, the diffusion of the electrolyte can be improved).

The organic solvent may have a configuration mainly composed of a specific solvent (for example, a 5-membered cyclic carbonate). In the case where a specific solvent is a main component, the ratio of the solvent as a main component in the whole solvent is preferably 50% by mass or more, more preferably 80% by mass or more, further preferably 90% by mass or more, still further preferably 95% by mass or more, and most preferably 98% by mass or more.

In the electrolytic solution, an ammonium ion represented by the following formula (I) is dissolved, and the concentration thereof is preferably 0.05 to 5M, more preferably 0.05 to 1.25M.

[Chem 8]

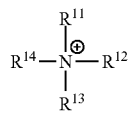

(I)

$R^{11}$ to $R^{14}$ in the above ammonium ion are each a hydrogen atom, an alkyl group or an aryl group, and may be the same or different from each other. Specifically, the alkyl group includes a methyl group, an ethyl group, a propyl group, a butyl group, a hexyl group, an octyl group, a dodecyl group and a stearyl group. From the viewpoint of the solubility in an organic solvent, a relatively short-chain alkyl group such as a methyl group, an ethyl group, a propyl group, a butyl group, or a hexyl group is preferred. The aryl group includes a phenyl group, a toluyl group, a xylyl group and a naphthyl group.

In view of solubility in an organic solvent, occurrence of absorption of visible light owing to an increase in conjugation length and the like, a hydrogen atom or an alkyl group is preferable.

In the preparation of the electrolytic solution, the ammonium ion is preferably added as a salt. The counter ion of the salt is preferably an iodide ion or an (iso)thiocyanate ion, and more preferably an iodide ion. Specific examples thereof include tetrahexylammonium iodide (THAI), tetrabutylammonium iodide (TBAI), tetraethylammonium iodide (TEAI), and ammonium iodide ($NH_4I$).

An inorganic salt is added to the electrolytic solution. When the LUMO (Lowest Unoccupied Molecular Orbital) level of the dye and the conduction band level of the semiconductor come sufficiently close to each other or are reversed, charge injection from the dye to the semiconductor is hindered. Lowering the conduction band level of the semiconductor (shifting it to the positive side) widens the difference from the LUMO level of the dye and allows the LUMO level of the dye and the conduction band level of the semiconductor to be difficult to come close to each other or be reverse. This result in the easy occurrence of the charge injection. Particularly, an inorganic salt is highly effective for lowering the conduction band level of the semiconductor. Among inorganic salts, alkali metal salts such as alkali metal halides and alkali metal perchlorates are preferred, and lithium halides and lithium perchlorates are more preferred. Specifically, LiI, NaI, LiCl, LiBr, $LiClO_4$, and $NaClO_4$ are preferred, and LiI and $LiClO_4$ are more preferred.

The concentration of the inorganic salt is preferably 0.05 to 5M, and more preferably 0.1 to 1M.

An iodide ion (I) is dissolved in the electrolytic solution, and the concentration thereof is preferably 0.1 to 10M, and more preferably 0.05 to 1.25M. As described above, in the preparation of the electrolytic solution, the iodide ion can be added in a salt state as a counter ion of the ammonium ion, and even when the inorganic salt is an alkali metal iodide, it can be added in the salt state. Therefore, the amount (molar concentration) of the iodide ion to be added preferably corresponds to the total amount (molar concentration) of the ammonium ion and the inorganic salt.

The electrolytic solution can further contain other components. Examples of the other components include a (iso) thiocyanate ion, a guanidinium ion represented by the formula (V) to be described later, an ammonium ion, a sodium ion, and a lithium ion. Among them, the inclusion of a guanidinium ion and a (iso)thiocyanate ion is preferable because obtained is an effect of suppressing the recombination of charges together with sufficient photoelectric conversion efficiency to improve the open-circuit voltage (Voc).

In the case where a thiocyanate ion ($S^-$—C≡N) or an isothiocyanate ion ($N^-$=C=S) is added to the electrolytic solution, the concentration of the total of the thiocyanate ion and the isothiocyanate ion in the electrolytic solution is preferably 0.01 to 1M, more preferably 0.02 to 0.5M, and most preferably 0.05 to 0.2M.

In the preparation of the electrolytic solution, the (iso) thiocyanate ion is preferably added as a salt. The counter ion of the salt is preferably a guanidinium ion to be described later, an ammonium ion, a sodium ion or a lithium ion, and more preferably a guanidinium ion.

In the case of adding a guanidinium ion represented by the following formula (V) to the electrolytic solution, the concentration of the guanidinium ion in the electrolytic solution is preferably 5M or less, and more preferably 1M or less.

[Chem 9]

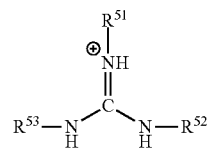

(V)

In the formula (V), $R^{51}$, $R^{52}$ and $R^{53}$ are each independently a hydrogen atom or an aliphatic group having 1 to 20 carbon atoms. The number of carbon atoms in the aliphatic group is preferably 1 to 12, more preferably 1 to 6, and most preferably 1 to 3. A hydrogen atom is more preferable than an aliphatic group. That is, an unsubstituted guanidinium ion is most preferable.

In the preparation of the electrolytic solution, the guanidinium ion is preferably added as a salt. The counter ion of the salt is preferably an iodide ion, a bromide ion, a chloride ion or a (iso)thiocyanate ion, and more preferably a (iso) thiocyanate ion.

In addition to the above additives, it is preferable to add a reducing agent to the electrolytic solution. By reducing the triiodide ion in the electrolytic solution with the reducing agent and thus removing the ion, the color of the electrolytic solution can be made light. As the reducing agent, preferred are inorganic compounds such as thiosulfate salts, sulfite salts, diborane, hydrazine, sodium borohydride, lithium aluminum hydride, diisobutylaluminum hydride, iron (II) ions, and tin (II) ions, and organic compounds such as ascorbic acid, oxalic acid, formic acid, gallic acid, hydroquinone derivatives, phenidone, pyrogallol, aminophenol and paramethylaminophenol sulfate (methol). Of these, thiosulfate salts are preferable, and sodium thiosulfate is particularly preferable. The addition amount is 0.01 mM to 50 mM, preferably 0.1 mM to 10 mM, and more preferably 0.3 mM to 5 mM. When the addition amount is less than 0.01 mM, the effect of lightening the color of the electrolytic solution is insufficient, and when it exceeds 50 mM, it is considered that the triiodide ion in the electrolytic solution is excessively removed and thus the case is not preferable.

Moreover, a nitrogen-containing ionic liquid can be added to the electrolytic solution. The cation of the nitrogen-containing ionic liquid includes a pyrrolidinium ion, a piperidinium ion, a pyridinium ion, a morpholinium ion, and a pyrazolium ion. The anion of the nitrogen-containing ionic liquid includes a halide ion, a hydroxide ion, a tetrachloroiron (Ill) ion, a tetrafluoroborate ion, a trifluoro(trifluoromethyl)borate ion, a phosphate ion, a hexafluorophosphate ion, a dimethyl phosphate ion, a methanesulfonate ion, a trifluoromethanesulfonate ion, an ethanesulfonate ion, a toluenesulfonate ion, a bis(trifluormmethanesulfonyl)imide ion, a bis(pentafluorethanesulfonyl)imide ion, a bis(fluorosulfonyl)imide ion, an acetate ion, a trifluoroacetate ion, a nitrate ion, a sulfate ion, a methyl sulfate ion, an ethyl sulfate ion, a thiocyanate ion, and dicyanamide. Specific examples of the nitrogen-containing ionic liquid include 1-butyl-1-methylpyrrolidinium bis(trifluoromethancsulfonyl)imide, 1-methyl-1-propylpiperidinium bis(trifluoromethanesulfonyl)imide, and 1-butyl-4-methylpyridinium tetrafluoroborate. The addition amount of the nitrogen-containing ionic liquid is 0.01M to 2M, preferably 0.02M to 1M, and more preferably 0.05M to 0.8M.

Furthermore, it is preferable to add a pyridine-based compound having an electron-withdrawing group to the electrolytic solution. The pyridine-based compound is preferably selected based on the correlation between the LUMO level of the dye and the conduction band level of the semiconductor. For example, in the case where charge injection is hindered because the LUMO level of the cyan dye and the conduction band level of the semiconductor are too close, the conduction band level of the semiconductor can be shifted to the positive side by adding a pyridine-based compound having an electron-withdrawing group to the charge transporting agent, and thus the charge injection can be promoted.

The pyridine-based compound having an electron-withdrawing group is preferably one in which 1 to 5 of five hydrogens of the pyridine are substituted with electron-withdrawing group(s). The electron-withdrawing group may be a halogen group such as a fluoro group, a chloro group, a bromo group or an iodo group, a halogen-substituted alkyl group such as a trifluoromethyl group, a carboxyl group, a carbonyl group, a cyano group, a nitro group, a formyl group, a sulfo group, or an acyl group. Furthermore, there can be also used nitrogen-containing aromatic compounds such as quinoline, naphthyridine, acridine, phenanthridine and phenanthroline, which are compounds containing a pyridine ring in a heterocyclic ring, pyrazine, pyrimidine, pyridazine, triazine, purine and pteridine, which are compounds containing a plurality of nitrogen atoms in a heterocyclic ring, adenine, guanine, cytosine, thymine and uracil, which are nucleic acid bases, and also compounds obtained by substituting hydrogen(s) thereof with the above functional group(s).

Specific examples thereof include pyridine-based compounds having an electron-withdrawing group, such as pyridines having a halogen group or a halogen-substituted alkyl group, such as 2-fluoropyridine, 3-fluoropyridine, 4-fluoropyridine, 2,3-difluoropyridine, 2,4-difluoropyridine, 2,5-difluoropyridine, 2,6-difluoropyridine, 3,5-difluoropyridine, 2,4,6-trifluoropyridine, 3,4,5-trifluoropyridine, 2,3,5,6-tetrafluoropyridine, pentafluoropyridine, 4-chloropyridine, 4-bromopyridine 4-iodopyridine, 2-trifluoromethylpyridine, 3-trifluoromethylpyridine, 4-trifluoromethylpyridine, 2,6-bis(trifluoromethyl)pyridine, 3,5-bis(trifluoromethyl)pyridine, 2,3-bis(trifluoromethyl)pyridine, 2-chloro-3-(trifluoromethyl)pyridine, 2-chloro-4-(trifluoromethyl)pyridine, 2-chloro-5-(trifluoromethyl)pyridine, 2-chloro-6-(trifluoromethyl)pyridine, 3,5-difluoro-4-(trifluoromethyl)pyridine, 2-amino-5-(trifluoromethyl)pyridine, 5-cyano-2-(trifluoromethyl)pyridine, 2,3-dichloro-5-(trifluoromethyl)pyridine, 2-fluoro-5-(trifluoromethyl)pyridine, 2-chloro-5-(trifluormethyl)pyridin-4-carboxylic acid, 2,3-difluoro-5-(trifluoromethyl)pyridine, 3,5-dichloro-2,4,6-trifluoropyridine, and 2-fluoro-3-formylpyridine, nicotinic acid (another name: pyridine-3-carboxylic acid), nicotinamide, methyl nicotinate, 2-cyanopyridine, 3-cyanopyridine, 4-cyanopyridine, 4-nitropyridine, 4-formylpyridine, pyridine-3-sulfonic acid, 2-acylpyridines having an acyl group at the 2-position of pyridine, such as 2-acetylpyridine, 2-propionylpyridine, 2-butyrylpyridine, 2-isobutyrylpyridine, 2-benzoylpyridine and 2-naphthoylpyridine, 3-acylpyridine, and 4-acylpyridine. Of these, 4-trifluoromethylpyridine, 3,5-difluoropyridine, and pentafluoropyridine are more preferable.

The addition amount of the pyridine-based compound having an electron-withdrawing group is 0.01M to 2M, preferably 0.05M to 1M, and more preferably 0.1 to 0.5M. When the addition amount is less than 0.01M, it is considered that the above-described injection improvement effect is insufficient. When the addition amount exceeds 2M, it is considered that the conduction band level of the semiconductor is excessively shifted to the positive side and thereby the charge injection efficiency is decreased. These cases are not preferred.

[Structure of Dye-Sensitized Photoelectric Conversion Element]

FIG. 1 is a cross-sectional view showing an example of the photoelectric conversion element. The illustrated photoelectric conversion element A has the configuration: a transparent conductive film 2 is formed on one surface of a transparent substrate 1; further, a semiconductor electrode 8 formed by integrating a semiconductor layer 3 on the surface thereof and a counter electrode 9 in which a catalyst layer 6 is formed on one surface of an electrode base material 7 are arranged separately such that the transparent conductive film 2 and the catalyst layer 6 are opposite to each other; and an electrolyte layer 5 is interposed between the semiconductor electrode 8 and the counter electrode 9. Moreover, a sensitizing dye 4 is adsorbed on the semiconductor layer 3. Hereinafter, each component is described in detail.

[Transparent Substrate 1]

As the transparent substrate 1, a material that transmits visible light can be used, and a transparent glass can be suitably used. Moreover, incident light can be utilized with high efficiency by processing the surface on the side where the transparent conductive film 2 is formed and thus scattering the incident light. Further, not only glass but also a plastic plate, a plastic film, and the like can be used as far as they transmit light.

The thickness of the transparent substrate 1 is not limited to particular thickness because it varies depending on the shape and use conditions of the photoelectric conversion element A. However, for example, in the case of using glass or plastic, about 1 mm to 1 cm is preferred in consideration of durability in actual use. In the case where flexibility is needed and a plastic film or the like is used, the thickness is preferably about 1 μm to 1 mm.

[Transparent Conductive Film 2]

For the transparent conductive film 2, a material that transmits visible light and has conductivity can be used. Examples of such a material include metal oxides. They are not limited to particular metal oxides, and for example, fluorine-doped tin oxide (hereinafter abbreviated as "FTO"), a mixture of tin oxide and indium oxide (hereinafter abbreviated as "ITO"), antimony-doped tin oxide (ATO), zinc oxide, indium-zinc oxide (IZO), gallium-zinc oxide (GZO), aluminum-zinc oxide (AZO) and the like can be preferably used.

Moreover, an opaque conductive material can be also used if visible light can be transmitted through it due to a treatment such as dispersion. Such materials include carbon materials and metals. In addition, a metal can transmit visible light when the metal has a mesh structure. Examples of the carbon materials include but not particularly limited to graphite (graphite), carbon black, glassy carbon, a carbon nanotube, and fullerene. Further, examples of the metals include but not particularly limited to platinum, gold, silver, ruthenium, copper, aluminum, nickel, cobalt, chromium, iron, molybdenum, titanium, tantalum, and alloys thereof.

The thickness of the transparent conductive film 2 is not limited to particular thickness because the conductivity varies depending on the material to be used. However, in the glass with the FTO film to be generally used, the thickness is 0.01 μm to 5 μm, and preferably 0.1 μm to 1 μm. Further, the required conductivity varies depending on the area of the electrode to be used, and a wider electrode requires lower resistance. However, in general, the sheet resistance (surface resistivity) is 100 Ω/€ or less, preferably 10 Ω/€ or less, and more preferably 5 Ω/€ or less. This sheet resistance is an electrical resistance value of a thin film or a film-like substance, and its unit is f, but is conventionally described as "Ω/€ (ohm/square)" for indicating that the value is derived from a sheet. Since the thickness of the laminate of the transparent substrate 1 and the transparent conductive film 2 or the thickness resulting from the integration of the transparent substrate 1 and the transparent conductive film 2 varies depending on the shape and use conditions of the photoelectric conversion element A as described above, the thickness is not limited to particular one, but is generally about 1 μm to 1 cm.

[Semiconductor Layer 3]

The semiconductor layer 3 is composed of a porous metal oxide semiconductor so that the sensitizing dye 4 can be easily adsorbed. The metal oxide semiconductor is not limited to particular one, but is preferably an n-type inorganic semiconductor. Examples of the n-type inorganic semiconductor include $TiO_2$, $TiSrO_3$, $ZnO$, $Nb_2O_3$, $SnO_2$, $WO_3$, $Si$, $CdS$, $CdSe$, $V_2O_5$, $ZnS$, $ZnSe$, $SnSe$, $KTaO_3$, $FeS_2$, and $PbS$. $TiO$, $ZnO$, $SnO_2$, $WO_3$ and $Nb_2O_3$ are preferred, titanium oxide, zinc oxide, tin oxide and composites thereof are more preferred, and particularly titanium dioxide and further, anatase type titanium dioxide are most preferred. Moreover, in order to lower the electric resistance value, it is desirable that the metal oxide has few grain boundaries. In order to adsorb a larger amount of the sensitizing dye 4, the metal oxide preferably has a large specific surface area, and specifically, 10 to 200 $m^2/g$ is desirable.

Such a semiconductor layer 3 can be provided on the transparent conductive film 2 by a known method, and examples thereof include a sol-gel method, application of a dispersion paste, and an electroprecipitation or electrodeposition method. The thickness of the semiconductor layer 3 is not limited to particular thickness because the optimum value varies depending on the oxide to be used, but is 0.1 μm to 50 μm, preferably 3 to 30 μm, and more preferably 5 to 15 μm.

In addition, as shown in the figure, as for the semiconductor layer 3, when the layer is formed as a two-layer structure in which a layer of large-diameter particles 3b is laminated on a layer of small-diameter particles 3a composed of a metal oxide semiconductor, it is also possible to utilize the "light confinement effect" of increasing the optical path length by scattering the incident light in the layer composed of the large-diameter particles 3b. In this case, the average particle diameter of the small-diameter particles 3a is preferably 100 nm or less, and the average particle diameter of the large-diameter particles 3b is preferably set to 100 nm to 700 μm. Incidentally, the layer has a two-layer structure in the example of the figure, but it may be a single layer or it can also be formed as a multilayer structure of three or more layers. However, in the case of three or more layers, the layers are laminated so that the diameter becomes larger sequentially from the side closer to the transparent conductive film 2. In this case, the optimum value of thickness of the semiconductor layer varies depending on the oxide to be used and its average particle diameter, but it is preferable that the layer composed of the metal oxide closest to the transparent conductive film 2 has a thickness of 5 to 15 μm and the metal oxide layer farthest from the transparent conductive film 2 has a thickness of 3 to 10 μm.

[Sensitizing Dye 4]

It is sufficient that the sensitizing dye 4 is one which can be excited by sunlight and can inject electrons into the semiconductor layer 3, and a dye generally used in a photoelectric conversion element can be used. In order to enhance the conversion efficiency, it is desirable that the absorption spectrum thereof overlaps with the sunlight spectrum in a wide wavelength region and the dye has high light resistance. The sensitizing dye 4 includes metal complex dyes, for example, ruthenium complexes, iron complexes, and copper complexes. Furthermore, examples thereof include cyan dyes, magenta dyes, yellow dyes, porphyrin-based dyes, polyeno-based dyes, coumarin-based dyes, cyanine-based dyes, merocyanine-based dyes, squaric acid-based dyes, methine-based dyes, xanthene-based dyes, indoline-based dyes perylene-based dyes, carbazole-based dyes, and thiazole-based dyes.

In particular, the aforementioned electrolytic solution is suitable for three primary color dyes (cyan, magenta, and yellow), and high photoelectric conversion efficiency is obtained. The cyan dye has a maximum absorption wavelength range of 600 am to 780 nm, the magenta dye has a maximum absorption wavelength range of 500 nm to 600 am, and the yellow dye has a maximum absorption wavelength range of 380 am to 500 nm. Even when any of these dyes is used, sufficient photoelectric conversion efficiency can be obtained. Accordingly, it becomes possible to improve the design by forming a pattern composed of more various dyes.

(Electrolyte Layer 5)

The electrolyte layer 5 is a layer composed of the aforementioned electrolytic solution.

Regarding the semiconductor particles, the pores thereof in the porous structure are preferably filled with the electrolytic solution. Specifically, the ratio of the pores of the semiconductor layer 3 filled with the electrolytic solution is preferably 20% by volume or more, and more preferably 50% by volume or more.

The thickness of the electrolyte layer 5 can be adjusted by, for example, the size of the spacer provided between the semiconductor layer 3 and the counter electrode 9. The thickness of the portion where the electrolytic solution exists alone outside the semiconductor electrode 8 is preferably 1 µm to 70 µm, more preferably 1 µm to 50 µm, still more preferably 1 µm to 40 µm, and most preferably 1 µm to 30 µm.

The light transmittance of the electrolyte layer 5 is preferably 70% or more, more preferably 80% or more, and most preferably 90% or more in terms of the case where the thickness of the electrolyte layer 5 is 30 µm (in an optical path length of 30 µm). The measurement wavelength of the light transmittance is preferably 400 nm, and it is more preferable to have the above-described light transmittance in the entire wavelength region of 350 to 900 nm.

Moreover, the electrolytic solution can be physically and chemically gelated by adding a suitable gelling agent to the electrolyte solution. Gelation can prevent volatilization and leakage of the electrolytic solution and thus can enhance stabilization and durability. The gel is preferably chemically crosslinked, and in this case, it is preferable to use a gelling agent containing a polymer compound and a crosslinking agent. A gel is formed by the reaction of them and resultant formation of an onium salt Hereinafter, preferable polymer compounds and crosslinking agents are illustrated.

(Crosslinking Agent)

The crosslinking agent includes saturated hydrocarbons, unsaturated hydrocarbons, aromatic hydrocarbons, which have a plurality of the substituents A represented by following formula (A) and may contain a hetero atom.

[Chem 10]

$$A: -N(SO_2R^1)_2 \quad (A)$$

In the formula, each $R^1$ is independently a fluoro group, or an alkyl group or aryl group having a fluoro group, and the alkyl group or aryl group may have a substituent.

Such a crosslinking agent can form an onium salt with a polymer compound to be described later. Moreover, such a crosslinking agent achieves crosslinking from the substituent A as a base point. As a result, when a gel is formed, a halide ion and an organic acid are not contained. Thus, metal parts such as electrodes in contact with the gel are not corroded. Further, this crosslinking agent does not easily cause a crosslinking reaction at room temperature. On the other hand, the crosslinking reaction easily proceeds by applying energy such as heating. Hence, as for the gelling agent containing the crosslinking agent and the polymer compound, gel forming conditions can be easily selected. As a result, the production of the gel is facilitated and, for example, the gel formability can be made excellent.

Examples of the saturated hydrocarbons include alkanes and cycloalkanes. The saturated hydrocarbon may have a substituent other than the substituent A, and may be linear or branched.

Examples of the unsaturated hydrocarbon include alkenes, cycloalkenes, alkynes, and cycloalkynes. The unsaturated hydrocarbon may have a substituent other than the substituent A, and may be linear or branched.

Examples of the aromatic hydrocarbon include benzene, biphenyl, naphthalene, and anthracene. The aromatic hydrocarbon may have a substituent other than the substituent A.

$R^1$ is not limited to particular one as long as it is a fluoro group, or an alkyl group or aryl group having a fluoro group. Typically, the alkyl group having a fluoro group is an alkyl group having 1 to 20 carbon atoms and a fluoro group, preferably an alkyl group having 1 to carbon atoms and a fluoro group, more preferably an alkyl group having 1 to 3 carbon atoms and a fluoro group, and further preferably a trifluoromethyl group, a pentafluoroethyl group, or a heptafluoropropyl group.

Examples of the substituent A include $-N(SO_2F)_2$, $-N(SO_2CF_3)_2$, $-N(SO_2C_2F_3)_2$, $-N(SO_2C_3F_7)_2$, $-N(SO_2CHF_2)_2$, and $-N(SO_2CH_2F)_2$.

Of these, the substituent A is preferably $-N(SO_2CF_3)_2$, $-N(SO_2C_2F_3)_2$, and $-N(SO_2C_3F_7)$ from the viewpoint of easy availability.

The above substituent other than the substituent A includes but not limited to an alkyl group having 1 to 30 carbon atoms, an alkoxy group having 1 to 30 carbon atoms, and an ester group having 1 to 30 carbon atoms.

The alkyl group, alkoxy group, and ester group may be further substituted with an amino group, a cyano group, or the like, and may be linear or branched.

Examples of the hetero atom include a nitrogen atom, a phosphorus atom, and a sulfur atom. Among the aforementioned ones, the hetero atom is preferably a nitrogen atom or a sulfur atom, and more preferably a nitrogen atom, from the viewpoint of easy availability.

Specific examples of the crosslinking agent containing the saturated hydrocarbon, unsaturated hydrocarbon, or aromatic hydrocarbon include compounds represented by the following formulae (1) to (4).

[Chem 11]

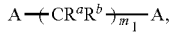  (1)

  (2)

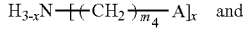  and  (3)

  (4)

$R^a$ and $R^b$ are each independently H or an alkyl group which may have a substituent.

$m_1$ is an integer of 1 to 30, preferably 3 to 30, and more preferably 6 to 30. Within the above range, various liquid media can be gelled.

$m_2$ and $m_3$ are each independently an integer of 1 to 30, preferably 1 to 10, and more preferably 2 to 5.

x is 2 or 3, preferably 3.

m is an integer of 1 to 15, preferably 1 to 10, and more preferably 2 to 5.

$R^c$ is an alkyl group having 1 to 20 carbon atoms which may have a substituent, and among these, 1 to 10 is preferable, and 1 to 5 is more preferable.

y is an integer of 1 to 15, preferably 3 to 15.

z is an integer of 2 to 10, and preferably 4 to 10 from the viewpoint of gelation ability.

The substituent is not limited to particular one and includes an alkyl group having 1 to carbon atoms, an alkoxy group, an ester group, a thiol group, a sulfide group, an amide group, and an imide group. The alkyl group, alkoxy group, ester group, thiol group, sulfide group, amide group and imide group may further have a substituent such as an alkyl group, an alkoxy group, an ester group, a thiol group, a sulfide group, an amide group and an imide group, and may be linear or branched.

Examples of the alkyl group include a methyl group, an ethyl group, an n-propyl group, an isopropyl group, an n-butyl group, a sec-butyl group, and a tert-butyl group.

Examples of the alkoxy group include a methoxy group, an ethoxy group, an n-propoxy group, an isopropoxy group, an n-butoxy group, a sec-butoxy group, and a tert-butoxy group.

More preferable examples of the saturated hydrocarbon, unsaturated hydrocarbon, or aromatic hydrocarbon include compounds represented by the following formulae (5) to (9). Particularly, (5) is preferable.

[Chem 12]

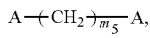
(5)

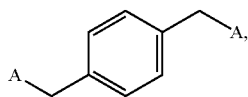
(6)

(7)

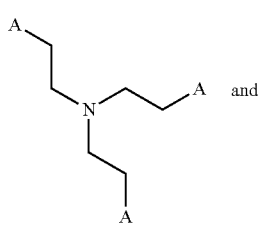
and
(8)

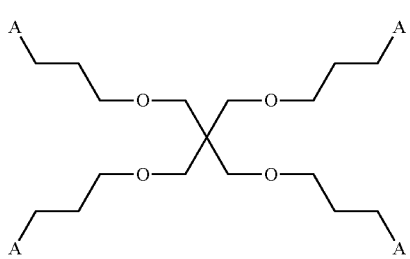
(9)

$m_5$ is an integer of 1 to 30, preferably 3 to 20, and more preferably 6 to 15.

The number of the substituents A of the above-described saturated hydrocarbon, unsaturated hydrocarbon or aromatic hydrocarbon contained in the crosslinking agent is 2 to and is not limited to particular one, but is preferably 2 to 5 from the viewpoint of easy synthesis.

The content of the crosslinking agent in the electrolytic solution is preferably 1 to 25% by mass, and more preferably 3 to 15% by mass.

(Polymer Compound)

The polymer compound contains a monomer unit having one or more elements selected from the group consisting of N, P and S.

Such a polymer compound is not limited to particular one as long as it contains the above-described monomer unit, and may contain, for example, one or two or more kinds of monomer units represented by the following formula (10).

Such a polymer compound is suitably crosslinked with the aforementioned crosslinking agent.

[Chem 13]

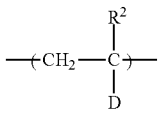
(10)

In the formula, $R^2$ is hydrogen or a methyl group, and D is a group having one or more elements selected from the group consisting of N, P and S.

From the viewpoint of easy availability, D mentioned above is preferably a group having a nitrogen atom.

Examples of the monomer unit of the formula (10) include a vinylpyridine unit, a vinylpyrrolidine unit, a vinylpyrrole unit, a vinyldimethylamine unit, a vinylimidazole unit, a dimethylaminoalkyl acrylate unit, a dimethylaminoalkyl methacrylate unit, a dimethylaminoalkylacrylamide unit, a vinyl phosphine unit, a vinylthiophene unit, and a vinylsulfide unit. Incidentally, the monomer unit may have a substituent.

The substituent includes but is not limited to an alkyl group having 1 to 30 carbon atoms, an alkoxy group, an ester group, a thiol group, a sulfide group, an amide group, and an imide group. The alkyl group, alkoxy group, ester group, thiol group, sulfide group, amide group and imide group may have further a substituent such as an alkyl group, an alkoxy group, an ester group, a thiol group, a sulfide group, an amide group, and an imide group, and may be linear or branched.

Examples of the alkyl group include a methyl group, an ethyl group, an n-propyl group, an isopropyl group, an n-butyl group, a sec-butyl group, and a tert-butyl group.

Examples of the alkoxy group include a methoxy group, an ethoxy group, an n-propoxy group, an isopropoxy group, an n-butoxy group, a sec-butoxy group, and a tert-butoxy group.

Of the monomer units represented by the above formula (10), from the viewpoint of easy gelation, monomer units represented by the following formulae (12) to (16) are preferable and monomer units represented by the formulae (12), (13) and (15) are more preferable. Particularly, (12) and (15) are preferable.

[Chem 14]

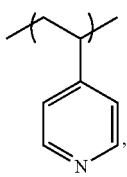
(12)

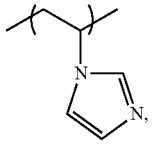
(13)

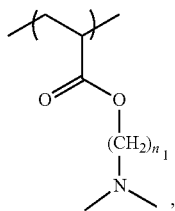

(14)

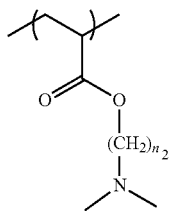

(15)

or

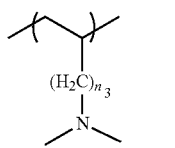

(16)

In the formula (14), $n_1$ is an integer of 1 to 10, preferably 1 to 5, and more preferably 2 to 3 from the viewpoint of easy availability.

In formula (15), $n_2$ is an integer of 1 to 10, preferably 1 to 5, and more preferably 2 to 3 from the viewpoint of easy availability.

In the formula (16), $n_3$ is an integer of 0 to 10, preferably 1 to 5, and more preferably 2 to 3 from the viewpoint of easy availability.

The number-average molecular weight of the polymer compound is not limited to particular one, but is 1,000 to 1,000,000, and from the viewpoint of polymer solubility, it is 10,000 to 200,000, and more preferably 10,000 to 100,000.

The content of the polymer in the electrolytic solution is 1 to 25% by mass, preferably 1 to 10% by mass, and more preferably 2 to 6% by mass.

The crosslinking agent and the polymer compound have been described above.

Particularly, the crosslinking agent is preferably N,N,N',N'-tetra(trifluoromethanesulfonyl)-dodecane-1,12-diamine or N,N,N',N'-tetra(trifluoromethanesulfonyl)-hexane-1,6-diamine, and the polymer compound is preferably poly(4-vinylpyridine) or poly(dimethylaminoethyl methacrylate). They can be used in combination as a suitable gelling agent. Particularly a preferred gelling agent is a combination of poly(4-vinylpyridine) and N,N,N',N'-tetra(trifluoromethanesulfonyl)-dodecane-1,12-diamine or N,N,N',N'-tetra(trifluoromethanesulfonyl)-hexan-1,6-diamine.

There is no limitation on the method of gelation and, as for the timing of gelation of the electrolytic solution, the electrolytic solution may be gelated in advance and then sealed into a dye-sensitized photoelectric conversion element, or the electrolytic solution before gelation may be sealed into the dye-sensitized photoelectric conversion element and then gelated.

In a specific method of gelation in advance, the electrolytic solution is gelled by heating in a state where the electrolytic solution, the polymer compound and the crosslinking agent are mixed. The gelled electrolytic solution is sealed into a dye-sensitized photoelectric conversion element. The order of addition of the electrolytic solution, the polymer compound and the crosslinking agent is not limited to particular one, and the timing of heating is not limited to particular one as long as it is before the sealing into the dye-sensitized photoelectric conversion element.

In a specific method of gelation after sealing the electrolyte solution before gelation into the dye-sensitized photoelectric conversion element, the electrolytic solution, the polymer compound and the crosslinking agent are mixed and sealed into the dye-sensitized photoelectric conversion element in a state where sufficient heat is not performed. Thereafter, the electrolytic solution is gelled by heating the whole dye-sensitized photoelectric conversion element.

In the above method, the heating temperature is not limited to particular one, but is preferably 40 to 120° C., and more preferably 40 to 80° C. in view of economical efficiency, reactivity, and the heat resistance of the dye-sensitized photoelectric conversion element. When the heating temperature falls within the above range, gel formation proceeds satisfactorily.

[Counter Electrode 9]

The counter electrode 9 is configured by forming the catalyst layer 6 on the surface of the electrode base material 7. Since the electrode base material 7 is used as a support and current collector of the catalyst layer 6, it is suitable to form a conductor 7" on the surface of the substrate 7'. As the substrate 7', it is suitable to use a transparent glass plate, a plastic plate, a plastic film, or the like, and an opaque substrate, a metal plate integrated with the conductor 7", or the like can also be used. As the conductor 7", metals such as platinum, gold, silver, ruthenium, copper, aluminum, nickel, cobalt, chromium, iron, molybdenum, titanium, tantalum and alloys thereof, carbon materials such as graphite, carbon black, glassy carbon, carbon nanotubes and fullerenes can be used. Moreover, metal oxides such as FTO, ITO, ATO, zinc oxide, IZO, GZO, and AZO can also be used.

[Catalyst Layer 6]

The catalyst layer 6 is not limited to particular one as long as it has electrode characteristics capable of promptly transferring electrons to and from the electrolyte layer 5. Examples thereof include one obtained by application of chloroplatinic acid and heat treatment, platinum catalyst electrodes deposited with platinum, carbon materials such as activated carbon, glassy carbon, and carbon nanotubes, inorganic compounds such as cobalt chloride, and conductive polymers such as polythiophene, polypyrrole, and polyaniline. Of these, platinum catalyst electrodes and conductive polymers are preferred.

The thickness of the catalyst layer 6 is suitably 10 nm to 5 μm, and particularly preferably 20 nm to 2 μm.

Moreover, the photoelectric conversion element can be prepared according to a conventionally well-known method. After preparing the above component materials, the semiconductor electrode 8 and the counter electrode 9 are arranged opposite to each other, and after encapsulation with a sealing material (not shown), a solution for forming the electrolyte layer 5 is injected.

EXAMPLES

<Test 1>
(Preparation of Semiconductor Electrode)

Glass with an FTO film (manufactured by AGC Fabritech Co., Ltd.) was cut out to a required size, and was subjected to ultrasonic cleaning with a glass detergent, pure water, acetone, and isopropyl alcohol (hereinafter IPA) in the order for 10 minutes each. After drying, the glass was immersed in an aqueous solution of titanium tetrachloride (manufactured by FUJIFILM Wako Pure Chemical Corporation) at 70° C. for 30 minutes. After immersion, it was washed with pure water and dried well. Then, a titanium oxide paste ("OOCTP-1000" manufactured by Osaka Gas Co., Ltd.) was applied to the surface of the FTO film by a screen printing method, and was allowed to stand and dried at 120° C. for about 3 minutes. A titanium oxide paste ("Ti-nanoxide D/SP" manufactured by Solaronix) was applied thereon by a screen printing method and was allowed to stand and dried at 120° C. for about 3 minutes to form a layer composed of small-diameter particles. Thereafter, the resultant was baked at 500° C. in the atmosphere.

Furthermore, it was immersed in an aqueous titanium tetrachloride solution at 70° C. for 30 minutes. After immersion, it was washed with pure water and dried well. Then, a titanium oxide paste ("Ti-nanoxide R/SP" manufactured by Solaronix) was applied on the titanium oxide film by a screen printing method, and was allowed to stand and dried at 120° C. for about 3 minutes to form a layer composed of large-diameter particles. Thereafter, the resultant was baked at 500° C. in the atmosphere to obtain a semiconductor layer having a thickness of about 10 μm and composed of a porous metal oxide.

Then, the sensitizing dye shown in Table 1 was adsorbed to the semiconductor particles to prepare semiconductor electrode.

In (Examples 1-1, 2-1, and 5-1), (Comparative Examples 1-1 and 3-1) and Reference Example, the ruthenium complex dye "N719" (bis(tetrabutylammonium)[cis-di(thiocyanato)-bis(2,2'-bipyridyl-4-carboxylate-4'-carboxylic acid)-ruthenium(II)], manufactured by Aldrich) was used. It was dissolved in a mixed solution of acetonitrile manufactured by FUJIFILM Wako Pure Chemical Corporation and t-butyl alcohol manufactured by FUJIFILM Wako Pure Chemical Corporation (volume ratio 1:1) to obtain a 0.5 mM dye solution. Then, the above semiconductor electrode was immersed in the dye solution, and the whole was allowed to stand at about 40° C. under shading condition for 16 hours. Thereafter, the excess sensitizing dye was washed with the same acetonitrile/t-butyl alcohol and the electrode was air-dried.

In (Examples 1-2 and 2-2), the squaric acid-based dye "SQ2" (Sensitizer SQ2, manufactured by Solaronix) and chenodeoxycholic acid (manufactured by FUJIFILM Wako Pure Chemical Corporation) were dissolved in ethanol manufactured by Junsei Chemical Co., Ltd. so as to be 0.2 mM and 2 mM, respectively, and the semiconductor electrode was immersed in the dye solution and allowed to stand at room temperature under shading condition for 2 hours. Thereafter, the excess sensitizing dye was washed with the same ethanol and air-dried.

In other Examples and Comparative Examples, dye adsorption was performed in the same manner as in the above (Example 1-2) except that each of cyan, magenta, and yellow dyes was dissolved in ethanol to form a 0.3 mM dye solution.

(Preparation of Counter Electrode)

A conductive polymer (PEDOT) film was formed on the surface at the ITO film side of a glass plate with an ITO film by the following procedure to prepare a counter electrode.

First, a monomer solution was prepared. A predetermined amount of 3,4-ethylenedioxythiophene was taken into a dry 100 mL flask, about 50 mL of acetonitrile was added thereto, and it was dissolved. Thereafter, a lithium salt-based dopant was added thereto and the whole was shaken until the solid was dissolved. Finally, acetonitrile was added such that the total amount became 100 mL and thus a monomer solution was formed.

Then, a glass plate with an ITO film manufactured by Geomatec Co., Ltd. was cut into a required size into a storage tank of the monomer solution. The glass plate was subjected to ultrasonic cleaning for 10 minutes each with a glass detergent, pure water, acetone, and IPA in this order and then dried. The resultant glass plate was arranged as a working electrode. Electrodes with an FTO film were arranged as a counter electrode and a reference electrode, and constant-current electrolytic polymerization was performed at 10 μA/cm$^2$ using a potentiostat "SP-150" manufactured by Bio Logic. After the polymerization, the working electrode was washed with acetonitrile, and then dried at 50° C. for about 3 minutes to form a conductive polymer film (PEDOT film) on the electrode with the ITO film.

[Preparation of Electrolytic Solution]

Electrolytic solutions having the compositions described in (Examples 1-1 to 5-8), (Comparative Examples 1-1 to 3-2) and Reference Example shown in Table 1 were prepared. As reagents, used were tetrabutylammonium iodide (TBAI) (manufactured by Tokyo Chemical Industry Co., Ltd.), guanidine thiocyanate (GnSCN) (manufactured by Tokyo Chemical Industry Co., Ltd.), 1-butyl-3-methylimidazolium iodide (BMII) (manufactured by Aldrich), N-methylbenzimidazole (NMBI) (manufactured by Tokyo Chemical Industry Co., Ltd.), lithium perchlorate (anhydrous) (LClO$_4$) (manufactured by FUJIFILM Wako Pure Chemical Corporation), sodium perchlorate (NaClO$_4$) (manufactured by Kanto Chemical Co., Inc.), lithium chloride (LiCl) (manufactured by Tokyo Chemical Industry Co., Ltd.), lithium bromide (LiBr) (manufactured by Tokyo Chemical Industry Co., Ltd.), lithium iodide (LiI) (manufactured by FUJIFILM Wako Pure Chemical Corporation), sodium iodide (NaI) (manufactured by FUJIFILM Wako Pure Chemical Corporation), iodine (I$_2$) (manufactured by FUJIFILM Wako Pure Chemical Corporation), tetrahexylammonium iodide (THAI) (manufactured by Tokyo Chemical Industry Co., Ltd.), tetraethylammonium iodide (TEAI) (manufactured by Tokyo Chemical Industry Co., Ltd.), ammonium iodide (NH$_4$I) (manufactured by FUJIFILM Wako Pure Chemical Corporation), guanidine hydroiodide (GnI) (manufactured by Tokyo Chemical Industry Co., Ltd.), 1-methylguanidine hydrochloride (MeGnCl) (manufactured by Tokyo Chemical Industry Co., Ltd.), ammonium thiocyanate (NH$_4$SCN) (manufactured by FUJIFILM Wako Pure Chemical Corporation), sodium thiocyanate (NaSCN) (manufactured by Junsei Chemical Co., Ltd.), 3-methoxypropionitrile (3-MPN) (manufactured by Tokyo Chemical Industry Co., Ltd.), propylene carbonate (PC) (manufactured by Kanto Chemical Co., Inc.), acetonitrile (ACN) (manufactured by FUJIFILM Wako Pure Chemical Corporation), γ-butyrolactone (GBL) (manufactured by FUJIFILM Wako Pure Chemical Corporation), and ethyl isopropyl sulfone (EIPS) (manufactured by Tokyo Chemical Industry Co., Ltd.).

Then, each of the above electrolyte solutions was filled between the semiconductor electrode and the counter electrode described above to prepare a dye-sensitized photoelectric conversion element. As the spacer, a heat-fusible film "PECF-HM" manufactured by Peccell Technologies, Inc. was used.

The prepared dye-sensitized photoelectric conversion element was evaluated based on the hue of the electrolyte layer and the photoelectric conversion characteristics.

[Hue of Electrolyte Layer]

Figure 2:
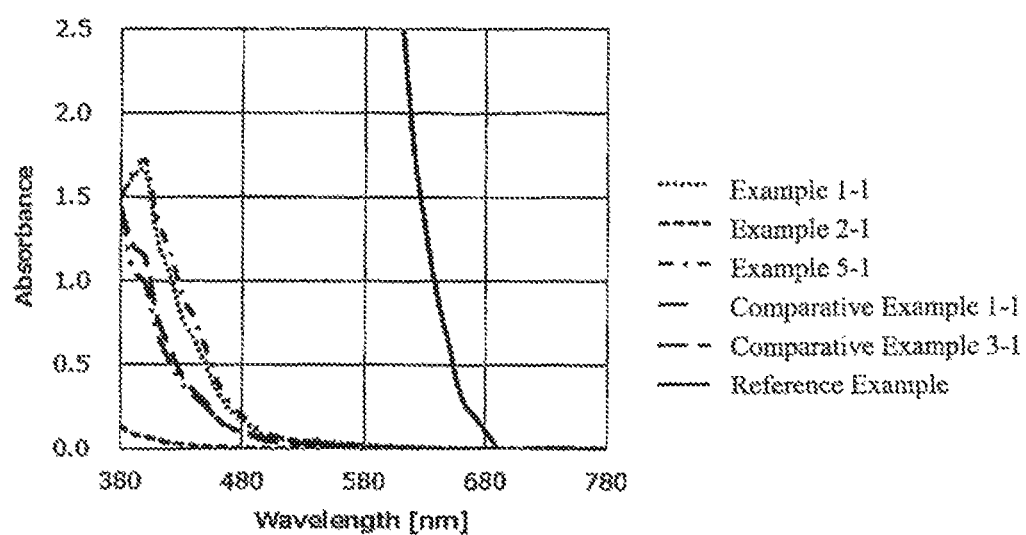
FIG. 2 It is a graph showing the relationship between the wavelength and absorbance of Example 1-1, Example 2-1, Example 5-1, Comparative Example 1-1, Comparative Example 3-1, and Reference Example.

Regarding the electrolyte layers having the concentration described in Examples, absorption spectrum was measured at an optical path length of 1 cm by visual confirmation and a spectrophotometer (SE6000 manufactured by Nippon Denshoku Industries Co., Ltd.). The results are shown in Table 1 and FIG. 2. The color of the electrolyte layer of Reference Example is dark brown, and the absorption is large in almost all the visible region as shown in FIG. 2. On the other hand, except for Reference Example, all are light yellow, have little absorption in the visible region, and reflect the color patterns resulting from the dyes of the semiconductor electrodes.

[Evaluation of Photoelectric Conversion Characteristics]

In order to evaluate the photoelectric conversion characteristics of each photoelectric conversion element, a white LED light irradiation device "C-FLED2" manufactured by Nikon Corporation was used, and maximum output (Pmax) at about 700 lux and open circuit voltage (Voc) were measured. The results are shown in Table 1.

TABLE 1

| | | Addition amount | | | | | | | | |
|---|---|---|---|---|---|---|---|---|---|---|
| | | Ammonium salt | | Inorganic salt | | Additive 1 | | Additive 2 | | Additive 3 | |
| | | Kind | Conc. (M) | Kind | Conc. (M) | Kind | Conc. (M) | Kind | Conc. (M) | Kind | Conc. (M) |
| Example 1 | Example 1-1<br>Example 1-2<br>Example 1-3<br>Example 1-4<br>Example 1-5 | TBAI | 0.4 | $LiClO_4$ | 0.2 | GnSCN | 0.1 | — | — | — | — |
| Example 2 | Example 2-1<br>Example 2-2<br>Example 2-3<br>Example 2-4<br>Example 2-5<br>Example 2-6 | TBAI | 0.4 | $LiClO_4$ | 0.2 | GnSCN | 0.1 | — | — | — | — |
| Example 3 | Example 3-1<br>Example 3-2<br>Example 3-3 | TBAI<br>TEAI<br>$NH_4I$ | 0.4 | $LiClO_4$ | 0.2 | GnSCN | 0.1 | — | — | — | — |
| Example 4 | Example 4-1<br>Example 4-2<br>Example 4-3<br>Example 4-4<br>Example 4-5 | TBAI | 0.4 | $NaClO_4$<br>LiCl<br>LiBr<br>LiI<br>NaI | 0.2 | GnSCN | 0.1 | — | — | — | — |
| Example 5 | Example 5-1<br>Example 5-2<br>Example 5-3<br>Example 5-4<br>Example 5-5<br>Example 5-6<br>Example 5-7<br>Example 5-8 | TBAI | 0.4 | $LiClO_4$ | 0.2 | —<br><br><br><br>GnI<br>McGnCl<br>$NH_4SCN$<br>NaSCN | 0.1 | — | — | — | — |
| Comparative Example 1 | Comparative Example 1-1<br>Comparative Example 1-2 | TBAI | 0.4 | — | — | GnSCN | 0.1 | BMII | 0.4 | NMBI | 0.1 |
| Comparative Example 2 | Comparative Example 2-1 | — | — | $LiClO_4$ | 0.2 | GnSCN | 0.1 | — | — | — | — |
| Comparative Example 3 | Comparative Example 3-1<br>Comparative Example 3-2 | TBAI | 0.4 | — | — | GnSCN | 0.1 | — | — | — | — |
| Reference Example | Reference Example 1-1 | TBAI | 0.2 | NaI | 1.0 | — | | — | | — | |

| | | Addition amount | | Ion concentration | | | | Molar ratio of $I_3^-$ to $I^-$ |
|---|---|---|---|---|---|---|---|---|
| | | Iodine ($I_2$) | | Ammonium ion | Iodide ion | Guanidinium ion | Thiocyanate ion | |
| | | Kind | Conc. (M) | Concentration (M) | | | | $(I_3^-)/(I^-)$ (%) |
| Example 1 | Example 1-1<br>Example 1-2<br>Example 1-3<br>Example 1-4<br>Example 1-5 | — | — | 0.4 | 0.4 | 0.1 | 0.1 | 0% |
| Example 2 | Example 2-1<br>Example 2-2<br>Example 2-3<br>Example 2-4<br>Example 2-5<br>Example 2-6 | — | — | 0.4 | 0.4 | 0.1 | 0.1 | 0% |

TABLE 1-continued

| | | | | | | | | |
|---|---|---|---|---|---|---|---|---|
| Example 3 | Example 3-1 | — | — | 0.4 | 0.4 | 0.1 | 0.1 | 0% |
| | Example 3-2 | | | | | | | |
| | Example 3-3 | | | | | | | |
| Example 4 | Example 4-1 | — | — | 0.4 | 0.4 | 0.1 | 0.1 | 0% |
| | Example 4-2 | | | | | | | |
| | Example 4-3 | | | | | | | |
| | Example 4-4 | | | | 0.6 | | | |
| | Example 4-5 | | | | | | | |
| Example 5 | Example 5-1 | — | — | 0.4 | 0.4 | — | — | 0% |
| | Example 5-2 | | | | | | | |
| | Example 5-3 | | | | | | | |
| | Example 5-4 | | | | | | | |
| | Example 5-5 | | | | 0.5 | 0.1 | — | |
| | Example 5-6 | | | | 0.4 | | | |
| | Example 5-7 | | | 0.5 | | — | 0.1 | |
| | Example 5-8 | | | 0.4 | | | | |
| Comparative Example 1 | Comparative Example 1-1 | — | — | 0.4 | 0.8 | 0.1 | 0.1 | 0% |
| | Comparative Example 1-2 | | | | | | | |
| Comparative Example 2 | Comparative Example 2-1 | — | — | — | — | 0.1 | 0.1 | 0% |
| Comparative Example 3 | Comparative Example 3-1 | — | — | 0.4 | 0.4 | 0.1 | 0.1 | 0% |
| | Comparative Example 3-2 | | | | | | | |
| Reference Example | Reference Example 1-1 | I₂ | 0.1 | 0.2 | 1.1 | — | — | 9.1% |

| | | | | | Pmax (uW/cm²) | | |
|---|---|---|---|---|---|---|---|
| | | Solvent | Hue of electrolytic solution layer | Sensitizing dye | Measured value | Evaluation | Voc (V) |
| Example 1 | Example 1-1 | 3-MPN | A (light yellow) | N719 | 20.43 | A | 0.39 |
| | Example 1-2 | | | SQ2 | 6.70 | A | 0.28 |
| | Example 1-3 | | | Cyan | 5.42 | A | 0.40 |
| | Example 1-4 | | | Magenta | 19.44 | A | 0.49 |
| | Example 1-5 | | | Yellow | 8.78 | A | 0.46 |
| Example 2 | Example 2-1 | PC | A (light yellow) | N719 | 16.26 | A | 0.38 |
| | Example 2-2 | | | SQ2 | 6.27 | A | 0.25 |
| | Example 2-3 | | | Cyan | 9.91 | A | 0.36 |
| | Example 2-4 | ACN | A+ (yellow lighter than Example) | Cyan | 6.66 | A | 0.37 |
| | Example 2-5 | GBL | | | 7.93 | A | 0.41 |
| | Example 2-6 | EIPS | A (light yellow) | | 9.10 | A | 0.37 |
| Example 3 | Example 3-1 | 3-MPN | A (light yellow) | Cyan | 8.95 | A | 0.42 |
| | Example 3-2 | | | | 6.30 | A | 0.41 |
| | Example 3-3 | | | | 6.23 | A | 0.39 |
| Example 4 | Example 4-1 | 3-MPN | A (light yellow) | Cyan | 6.22 | A | 0.43 |
| | Example 4-2 | | | | 4.12 | A | 0.41 |
| | Example 4-3 | | | | 8.12 | A | 0.42 |
| | Example 4-4 | | | | 7.51 | A | 0.41 |
| | Example 4-5 | | | | 4.95 | A | 0.41 |
| Example 5 | Example 5-1 | 3-MPN | A (light yellow) | N719 | 16.32 | A | 0.35 |
| | Example 5-2 | | | Cyan | 8.04 | A | 0.31 |
| | Example 5-3 | | | Magenta | 12.88 | A | 0.35 |
| | Example 5-4 | | | Yellow | 6.24 | A | 0.35 |
| | Example 5-5 | | | Cyan | 7.56 | A | 0.39 |
| | Example 5-6 | | | | 7.04 | A | 0.41 |
| | Example 5-7 | | | | 4.96 | A | 0.35 |
| | Example 5-8 | | | | 6.82 | A | 0.39 |
| Comparative Example 1 | Comparative Example 1-1 | PC | A (light yellow) | N729 | 22.09 | A | 0.49 |
| | Comparative Example 1-2 | | | Cyan | 0.22 | C | 0.26 |
| Comparative Example 2 | Comparative Example 2-1 | 3-MPN | A (light yellow) | Cyan | 0.52 | B | 0.27 |
| Comparative Example 3 | Comparative Example 3-1 | 3-MPN | A (light yellow) | N719 | 24.54 | A | 0.50 |
| | Comparative Example 3-2 | | | Cyan | 2.60 | B | 0.37 |

TABLE 1-continued

| | | | | | | | |
|---|---|---|---|---|---|---|---|
| Reference Example | Reference Example 1-1 | ACN | C (dark brown) | N719 | 13.43 | A | 0.30 |

— Pmax: a case where the value at 700 lux is 3.0 uW/cm² or more was evaluated as A, a case where the value at 700 lux is 0.5 uW/cm² or more and less than 3.0 uW/cm² was evaluated as B, and a case where the value at 700 lux is less than 0.5 uW/cm² was evaluated as C.
TBAI: tetrabutylammonium iodide
GnSCN: guanidine thiocyanate
BMII: 1-butyl-3-methylmidiazoliom iodide
NMBI: N-mediylbenzimidazole
LiClO$_4$: lithium perchlorate
NaClO$_4$: sodium perchlorate
LiCl: lithium chloride
LiBr: lithium iodide
LiI: lithium iodide
NaI: sodium iodide
I$_2$: iodine
THAI: tetrahexylammonium iodide
TEAI: tetraethyllammonium iodide
NH$_4$I: ammonium iodide
GnI: guanidine hydroiodide
MeGnCl: 1-methylguanidine hydrochloride
NH$_4$SCN: ammonium thiocyanate
NaSCN: sodium thiocyanate
3-MPN: 3-methoxypropionitrile
PC: propylene carbonate
ACN: acetonitrile
GBL: γ-butyrolactone
EIPS: ethyl isopropyl sulfone
* Ion concentration was calculated from the addition amount.

From the results in Table 1, the followings are obvious.

(1) Use of the general-purpose ruthenium dye (N719) as a dye provides equal or higher photoelectric conversion efficiency in the composition of the present invention (Example 1-1) as compared with the composition reproducing Patent Document 1 (Comparative Example 1-1) and the composition where iodine is added (Reference Example). Comparison between (Example 1-1) and (Comparative Example 1-1 and Reference Example).

(2) High photoelectric conversion efficiency is achieved not only with the general-purpose dyes (N719, SQ2) but also with any of the cyan, magenta, and yellow dyes that are three primary colors. Accordingly, various dyes can be used, and the electrolyte layer is light in color, so that a more multicolored color pattern is reflected and the design becomes excellent. Comparison between (Example 1-1) and (Examples 1-2 to 1-5).

(3) Also use of PC as a solvent instead of 3-MPN provides high photoelectric conversion efficiency. Comparison between (Examples 1-1 to 1-3) and (Examples 2-1 to 2-3).

(4) Containing no ammonium salt as a solute of the electrolytic solution lowers both of the photoelectric conversion efficiency and the open circuit voltage. Comparison between (Example 1-3) and (Comparative Example 2-1).

(5) Containing guanidine thiocyanate as a solute of the electrolytic solution suppress the recombination of charges to improve the open circuit voltage (Voc). However, the photoelectric conversion efficiency is high for N719 but low for cyan dyes. Comparison between (Examples 5-1 to 5-4) and (Examples 1-1, 1-3 to 1-5).

(6) Containing no inorganic salt as a solute of the electrolytic solution improves the open circuit voltage (Voc) but provide insufficient photoelectric conversion efficiency with a cyan dye. It is attributed that the LUMO of the cyan dye and the conduction band level of the semiconductor are too close to each other and thus charge injection is suppressed. Addition of an inorganic salt makes the conduction band level of the semiconductor positively shifted to promote charge injection. Comparison between (Example 1-1 and 1-3) and (Comparative Example 3-1 and 3-2).

(7) Also use of another solvent as a solvent instead of 3-MPN does not impair the hue of the electrolyte layer, and provides sufficient photoelectric conversion efficiency. Comparison between (Example 1-3) and (Examples 2-4 to 2-6).

(8) Also use of another ammonium salt as a solute of the electrolytic solution instead of tetrabutylammonium iodide provides sufficient photoelectric conversion efficiency. Comparison between (Example 1-3) and (Examples 3-1 to 3-3).

(9) Also use of another inorganic salt as a solute of the electrolytic solution instead of lithium perchlorate provides sufficient photoelectric conversion efficiency. Comparison between (Example 1-3) and (Examples 4-1 to 4-5).

(10) Also use of another guanidinium salt or thiocyanate salt as a solute of the electrolytic solution instead of guanidine thiocyanate salt provides sufficient photoelectric conversion efficiency Comparison between (Example 1-3) and (Examples 5-5 to 5-8).

<Test 2>

In Test 2, the addition of a reducing agent and a nitrogen-containing ionic liquid was verified. That is, a dye-sensitized photoelectric conversion element having an electrolyte layer prepared by adding Additive 2 (reducing agent) and Additive 3 (nitrogen-containing ionic liquid) shown in Table 2 to the electrolytic solution of Example 1 in Test 1 was prepared. Then, the photoelectric conversion characteristics were measured in the same manner as in Test 1. Na$_2$S$_2$O$_3$ in Additive 2 shown in the table is sodium thiosulfate (manufactured by FUJIFILM Wako Pure Chemical Corporation), and BMPy-r.TFSI in Additive 3 is 1-butyl-1-methylpyrrolidinium bis(trifluoromethanesulfonyl)imide (manufactured by Iolitec), MPPip.TFSI is 1-methyl-1-propylpiperidinium bis(trifluoromethanesulfonyl)imide (manufactured by Kanto Chemical Co., Inc.), and BMPy.BF$_4$ is 1-butyl-4-methylpyridinium tetrafluoroborate (manufactured by Fluka).

TABLE 2

| | | Addition amount | | | | | | | |
|---|---|---|---|---|---|---|---|---|---|
| | | Ammonium salt | | Inorganic salt | | Additive 1 | | Additive 2 | |
| | | Kind | Conc. (M) | Kind | Conc. (M) | Kind | Conc. (M) | Kind | Conc. (M) |
| Example 6 | Example 6-1<br>Example 6-2<br>Example 6-3 | TBAI | 0.4 | LiClO$_4$ | 0.2 | GnSCN | 0.1 | NA$_2$S$_2$O$_3$ | 0.005 |
| Example 7 | Example 7-1<br>Example 7-2<br>Example 7-3 | TBAI | 0.4 | LiClO$_4$ | 0.2 | GnSCN | 0.1 | NA$_2$S$_2$O$_3$ | 0.005 |
| Example 8 | Example 8-1<br>Example 8-2<br>Example 8-3 | TBAI | 0.4 | LiClO$_4$ | 0.2 | GnSCN | 0.1 | NA$_2$S$_2$O$_3$ | 0.005 |
| Example 9 | Example 9-1<br>Example 9-2<br>Example 9-3 | TBAI | 0.4 | LiClO$_4$ | 0.2 | GnSCN | 0.1 | NA$_2$S$_2$O$_3$ | 0.005 |

| | | Addition amount | | | | Ion concentration | | | |
|---|---|---|---|---|---|---|---|---|---|
| | | Additive 3 | | Iodine (I$_2$) | | Ammonium | Iodide ion | Guanidinium ion | Thiocyanate ion |
| | | Kind | Conc. (M) | Kind | Conc. (M) | Concentration (M) | | | |
| Example 6 | Example 6-1<br>Example 6-2<br>Example 6-3 | — | — | — | — | 0.4 | 0.4 | 0.1 | 0.1 |
| Example 7 | Example 7-1<br>Example 7-2<br>Example 7-3 | BMPy-TFSI | 0.4 | — | — | 0.4 | 0.4 | 0.1 | 0.1 |
| Example 8 | Example 8-1<br>Example 8-2<br>Example 8-3 | MPPip-TFSI | 0.4 | — | — | 0.4 | 0.4 | 0.1 | 0.1 |
| Example 9 | Example 9-1<br>Example 9-2<br>Example 9-3 | BMpy-TFSI | 0.4 | — | — | 0.4 | 0.4 | 0.1 | 0.1 |

| | | Ion concentration Molar ratio of I$_3^-$ to I$^-$ (I$_3^-$)/(I$^-$) (%) | Solvent | Hue of electrolyte solution layer | Sensitizing dye | Pmax (uW/cm$^2$) Measured value | Evaluation | Voc (V) |
|---|---|---|---|---|---|---|---|---|
| Example 6 | Example 6-1 | 0% | 3-MPN | A+ yellow lighter than Example) | Cyan | 4.83 | A | 0.31 |
| | Example 6-2 | | | | Magenta | 8.70 | A | 0.33 |
| | Example 6-3 | | | | Yellow | 4.33 | A | 0.31 |
| Example 7 | Example 7-1 | 0% | 3-MPN | A (light yellow) | Cyan | 4.08 | A | 0.28 |
| | Example 7-2 | | | | Magenta | 7.45 | A | 0.31 |
| | Example 7-3 | | | | Yellow | 3.83 | A | 0.28 |
| Example 8 | Example 8-1 | 0% | 3-MPN | A (light yellow) | Cyan | 4.59 | A | 0.30 |
| | Example 8-2 | | | | Magenta | 7.12 | A | 0.27 |
| | Example 8-3 | | | | Yellow | 3.79 | A | 0.27 |
| Example 9 | Example 9-1 | 0% | 3-MPN | B (brown) | Cyan | 3.91 | A | 0.29 |
| | Example 9-2 | | | | Magenta | 6.40 | A | 0.23 |
| | Example 9-3 | | | | Yellow | 1.12 | B | 0.19 |

— Pmax: a case where the value at 700 lux is 3.0 uW/cm$^2$ or more was evaluated as A, a case where the value at 700 lux is 0.5 uW/cm$^2$ or mare and less than 3.0 uW/cm$^2$ was evaluated as B, and a case where the value at 700 lux is less than 0.5 uW/cm$^2$ was evaluated as C.
TBAI: tetrabutylammonium iodide
GnSCN: guanidine thiocyanate
LiClO$_4$: lithium perchlorate
Na$_2$S$_2$O$_3$: sodium thiosulfate
BMPyr•TFSI 1 butyl-1-methylpyrroldinium bis(trifluoromethanesulfonyl)imide
MPPip•TFSI: 1methyl-1-propilpoperidinium bis(trifluoromethanesulfonyl)imide
BMPy•BF$_4$: 1-butyl-4-methylpyrinium tetrafluoroborate
3-MPN: 3-methoxypropionitrile
* Ion concentration was calculated from the addition amount From the results in Table 2, the followings are obvious.

(1) From Example 6, the addition of sodium thiosulfate, which is a reducing agent, has the electrolytic solution light in color and also provides high photoelectric conversion characteristics.

(2) From Examples 7 to 9, the addition of a nitrogen-containing ionic liquid in addition to sodium thiosulfate provides sufficiently high photoelectric conversion characteristics.

<Test 3>

In Test 3, pyridine-based compounds were verified. That is, a dye-sensitized photoelectric conversion element having an electrolyte layer obtained by adding Additive 2 (a pyridine-based compound) shown in Table 3 to the electrolytic solution of Example 1 in Test 1 was prepared. The photoelectric conversion characteristics were measured in the same manner as in Test 1. Of Additive 2 in the table, TFP is 4-trifluoromethylpyridine (manufactured by Aldrich), DFP is 3,5-difluoropyridine (manufactured by Aldrich), PFP is pentafluoropyridine (manufactured by Aldrich), and TBP is 4-tert-butylpyridine (manufactured by Aldrich).

TABLE 3

| | | Addition amount | | | | | | | |
|---|---|---|---|---|---|---|---|---|---|
| | | Ammonium salt | | Inorganic salt | | Additive 1 | | Additive 2 | |
| | | Kind | Conc. (M) | Kind | Conc. (M) | Kind | Conc. (M) | Kind | Conc. (M) |
| Example 10 | Example 10-1 | TBAI | 0.4 | $LiClO_4$ | 0.2 | GnSCN | 0.1 | TFP | 0.2 |
| Example 11 | Example 11-1 | TBAI | 0.4 | $LiClO_4$ | 0.2 | GnSCN | 0.1 | DFF | 0.2 |
| Example 12 | Example 12-1 | TBAI | 0.4 | $LiClO_4$ | 0.2 | GnSCN | 0.1 | PFP | 0.2 |
| | Example 12-2 | | | | | | | | |
| | Example 12-3 | | | | | | | | |
| Example 4 | Comparative Example 4-1 | TBAI | 0.4 | $LiClO_4$ | 0.2 | GnSCN | 0.1 | THP | 0.2 |

| | | | | Ion concentration | | | | |
|---|---|---|---|---|---|---|---|---|
| | | Addition amount Iodine ($I_2$) | | Ammonium ion | Iodide ion | Guanidinium ion | Thiocyanate ion | Molar ratio of $I_3^-$ to $I^-$ ($I_3^-$)/($I^-$) |
| | | Kind | Conc (M) | Concentration (M) | | | | (%) |
| Example 10 | Example 10-1 | — | — | 0.4 | 0.4 | 0.1 | 0.1 | 0% |
| Example 11 | Example 11-1 | — | — | 0.4 | 0 4 | 0.1 | 0.1 | 0% |
| Example 12 | Example 12-1 | — | — | 0.4 | 0.4 | 0.1 | 0.1 | 0% |
| | Example 12-2 | | | | | | | |
| | Example 12-3 | | | | | | | |
| Example 4 | Comparative Example 4-1 | — | — | 0.4 | 0.4 | 0.1 | 0.1 | 0% |

| | | | Hue Of | | Pmax ($uW/cm^2$) | | |
|---|---|---|---|---|---|---|---|
| | | Solvent | electrolyte solution layer | Sensitizing dye | Measured value | Evaluation | Voc (V) |
| Example 10 | Example 10-1 | 3-MPN | A (light yellow) | Cyan | 3.66 | A | 0.33 |
| Example 11 | Example 11-1 | 3-MPN | A (light yellow) | Cyan | 4.07 | A | 0.33 |
| Example 12 | Example 12-1 | 3-MPN | A (light yellow) | Cyan | 5.04 | A | 0.33 |
| | Example 12-2 | | | Magenta | 10.15 | A | 0.37 |
| | Example 12-3 | | | Yellow | 4.41 | A | 0.42 |
| Comparative Example 4 | Comparative Example 4-1 | 3-MPN | A (light yellow) | Cyan | 1.81 | B | 0.34 |

— Pmax: a case where the value at 700 lux is 3.0 $uW/cm^2$ or more was evaluated as ○, a case where the value is 0.5 $uW/cm^2$ or more and less than 3.0 $uW/cm^2$ was evaluated as Δ, and a case where the value is less than 0.5 $uW/cm^2$ was evaluated as X.
TBAI: tetrabutylammonium iodide
GnSCN: guanidine thiocyanate
$LiClO_4$: lithium perchlorate
TFP: 4-trifluoromethylpyridine
DFP: 3,5-difluoropyridine
PFP: pentafluoropyridine
TBP: 4-tert-butylpyridine
3-MPN: 3-methoxypropionitrile
* Ion concentration was calculated from addition amount.

From the results in Table 3, the followings are obvious.

(1) Among pyridine-based compounds, those having an electron-withdrawing group such as a fluoro group are preferable. Comparison between Examples 10 to 12 and Comparative Example 4.

(2) By adding a pyridine-based compound, the level difference between the LUMO level of the dye and the conduction band level of the semiconductor can be adjusted, and thus the charge injection efficiency is improved.

<Test 4>

In Test 4, the case where the electrolytic solution was gelled was verified. That is, the same dye-sensitized photoelectric conversion elements as in Test 1 were prepared except that the electrolyte layer had the composition shown in Table 4 and gelation treatment was performed by the method shown in Table 4. The photoelectric conversion characteristics thereof were measured in the same manner as in Test 1. In the gelling agent in the table, P4VP of the polymer compound is poly(4-vinylpyridine) manufactured by Kanto Chemical Co., Inc. and PDMAEMA is poly (dimethylaminoethyl methacrylate) (70% toluene solution) manufactured by Kanto Chemical Co., Inc. C12TFSA of a crosslinking agent is N,N,N',N'-tetra(trifluoromethanesulfonyl)-dodecane-1,12-diamine manufactured by Kanto Chemical Co., Inc., and C6TFSA is N,N,N',N'-tetra(trifluoromethanesulfonyl)-hexane-1,6-diamine manufactured by Kanto Chemical Co., Inc. GBL of a solvent is γ-butyrolactone manufactured by FUJIFILM Wako Pure Chemical Corporation.

For reference, in Table 4, described are the photoelectric conversion characteristics of each of the dye-sensitized photoelectric conversion elements of Example 1 and Example 13 in Test 1 each having an electrolyte layer in which the electrolytic solution is not gelled. In this regard, the electrolyte layer of Example 16 is one obtained by gelling the electrolytic solution of Example 1, and the electrolyte layers of Examples 14 and 15 are ones obtained by gelling the electrolytic solution of Example 13.

TABLE 4

| | | Addition amount | | | | | | | | Ion concentration | |
|---|---|---|---|---|---|---|---|---|---|---|---|
| | | Ammonium salt | | Inorganic salt | | Additive 1 | | Iodine ($I_2$) | | Ammonium ion | Iodide ion |
| | | Kind | Conc. (M) | Kind | Conc. (M) | Kind | Conc. (M) | Kind | Conc. (M) | Concentration (M) | |
| Example 1 | Example 1-1 | TBAI | 0.4 | $LiClO_4$ | 0.2 | GnSCN | 0.1 | — | — | 0.4 | 0.4 |
| | Example 1-2 | | | | | | | | | | |
| | Example 1-3 | | | | | | | | | | |
| | Example 1-4 | | | | | | | | | | |
| | Example 1-5 | | | | | | | | | | |
| Example 13 | Example 13-1 | TBAI | 0.4 | $LiClO_4$ | 0.2 | GnSCN | 0.1 | — | — | 0.4 | 0.4 |
| | Example 13-2 | | | | | | | | | | |
| | Example 13-3 | | | | | | | | | | |
| Example 14 | Example 14-1 | TBAI | 0.4 | $LiClO_4$ | 0.2 | GnSCN | 0.1 | — | — | 0.4 | 0.4 |
| | Example 14-2 | | | | | | | | | | |
| | Example 14-3 | | | | | | | | | | |
| | Example 14-4 | | | | | | | | | | |
| | Example 14-5 | | | | | | | | | | |
| | Example 14-6 | | | | | | | | | | |
| Example 15 | Example 15-1 | TBAI | 0.4 | $LiClO_4$ | 0.2 | GnSCN | 0.1 | — | — | 0.4 | 0.4 |
| Example 16 | Example 16-1 | TBAI | 0.4 | $LiClO_4$ | 0.2 | GnSCN | 0.1 | — | — | 0.4 | 0.4 |
| | Example 16-2 | | | | | | | | | | |
| | Example 16-3 | | | | | | | | | | |

| | | Ion concentration | | | Polymer compound | | Crosslinking agent | | |
|---|---|---|---|---|---|---|---|---|---|
| | | Guanidinium ion Concentration (M) | Thiocyanate ion | Molar ratio of $I_3^-$ to $I^-$ ($I_3^-$)/($I^-$) (%) | P4VP | PDMA-EMA % by weight relative to electrolytic solution | C12TFSA | C6TFSA | Solvent |
| Example 1 | Example 1-1 | 0.1 | 0.1 | 0% | — | — | — | — | 3-MPN |
| | Example 1 | | | | | | | | |
| | Example 1 | | | | | | | | |
| | Example 1 | | | | | | | | |
| | Example 1 | | | | | | | | |
| Example 13 | Example 13-1 | 0.1 | 0.1 | 0% | — | — | — | — | GBL |
| | Example 13-2 | | | | | | | | |
| | Example 13-3 | | | | | | | | |
| Example 14 | Example 14-1 | 0.1 | 0.1 | 0% | 3.2 | — | 11.1 | — | GBL |
| | Example 14-2 | | | | | | | | |
| | Example 14-3 | | | | | | | | |
| | Example 14-4 | | | | | 3.2 | — | 11.1 | — |
| | Example 14-5 | | | | | | | | |
| | Example 14-6 | | | | | | | | |
| Example 15 | Example 15-1 | 0.1 | 0.1 | 0% | 3.2 | — | — | 4.8 | GBL |
| Example 16 | Example 16-1 | 0.1 | 0.1 | 0% | — | 3.1 | 3.0 | — | 3-MPN |
| | Example 16-2 | | | | | | | | |
| | Example 16-3 | | | | | | | | |

TABLE 4-continued

| | | Hue of electrolyte solution layer | Method for gelation | Possibility of gelation | Sensitizing dye | Pmax (uW/cm²) Measured value | Evaluation | Voc (V) |
|---|---|---|---|---|---|---|---|---|
| Example 1 | Example 1-1 | A (light yellow) | — | — | N719 | 20.43 | A | 0.39 |
| | Example 1-2 | | | | SQ2 | 6.70 | A | 0.28 |
| | Example 1-3 | | | | Cyan | 5.25 | A | 0.34 |
| | Example 1-4 | | | | Magenta | 11.02 | A | 0.40 |
| | Example 1-5 | | | | Yellow | 4.20 | A | 0.29 |
| Example 13 | Example 13-1 | A (light yellow) | — | — | Cyan | 3.93 | A | 0.38 |
| | Example 13-2 | | | | Magenta | 15.55 | A | 0.48 |
| | Example 13-3 | | | | Yellow | 8.11 | A | 0.47 |
| Example 14 | Example 14-1 | A (light yellow) | Sealing after gelation | A | Cyan | 2.46 | B | 0.44 |
| | Example 14-2 | | | | Magenta | 12.11 | A | 0.51 |
| | Example 14-3 | | | | Yellow | 11.29 | A | 0.58 |
| | Example 14-4 | | Gelation after sealing as liquid | A | Cyan | 1.87 | B | 0.39 |
| | Example 14-5 | | | | Magenta | 14.39 | A | 0.52 |
| | Example 14-6 | | | | Yellow | 6.87 | A | 0.59 |
| Example 15 | Example 15-1 | A (light yellow) | Gelation after sealing as liquid | A | Magenta | 14.34 | A | 0.52 |
| Example 16 | Example 16-1 | A (light yellow) | Sealing after gelation | A | Cyan | 0.07 | C | 0.23 |
| | Example 16-2 | | | | Magenta | 2.63 | B | 0.47 |
| | Example 16-3 | | | | Yellow | 1.63 | B | 0.47 |

— Pmax: a case where the value at 700 lux is 3.0 uW/cm² or more was evaluated as A, a case where the value is 0.5 uW/cm² or more and less than 3.0 uW/cm² was evaluated as B, and a case where the value is less than 0.5 uW/cm² was evaluated as C.
TBAI: tetrabutylammonium iodide
GnSCN: guanidine thiocyanate
LiClO$_4$: lithium perchlorate
P4VP: poly(4-vinylpyridine)
PDMAEMA: poly(dimethylaminomethyl methacrylate)
C12TFSA: N,N,N',N'-tetra(trifluoromethanesulfonyl)-dodecane-1,12-diamine
C6TFSA: N,N,N',N'-tetra(trifluoromethanesulfonyl)-hexane-1,6-diamine
3-MPN: 3-methoxypropionitrile
GBL: γ-butyrolactone
* Ion concentration was calculated from addition amount.

From the results in Table 4, the followings are obvious.

(1) As shown in Examples 14 to 16, any of the electrolyte solutions can be gelled.

(2) As for the timing of gelation, the case of sealing a pre-gelled electrolyte and the case of gelation after sealing the electrolytic solution are both possible, and the timing does not significantly affect the photoelectric conversion characteristics. Comparison between Examples 14-1 to 14-3 and Examples 14-4 to 14-6.

(3) In the gelling agent, as for the polymer compound, it can be said that Pmax is larger in the case of P4VP than in the case of PDMAEMA and thus is preferable. Comparison between Examples 14 and 15 and Example 16.

(4) In the gelling agent, when the polymer compound is P4VP, there is no difference in the photoelectric conversion characteristics with the magenta dye between the crosslinking agents C12TFSA and C6TFSA. Comparison between Example 14-5 and Example 15.

While the present invention has been described in detail and with reference to specific embodiments thereof it will be apparent to one skilled in the art that various changes and modifications can be made therein without departing from the spirit and scope of the invention.

The present application is based on Japanese Patent Application No. 2017-141854 filed on Jul. 21, 2017 and Japanese Patent Application No. 2018-112220 filed on Jun. 12, 2018, and the contents of which are incorporated herein by reference.

INDUSTRIAL APPLICABILITY

The dye-sensitized photoelectric conversion element of the present invention can afford high photoelectric conversion efficiency regardless of the kind of sensitizing dye, has an excellent design, and is useful as a source of electric energy.

REFERENCE SIGNS LIST

A: Photoelectric conversion element
1: Transparent substrate
2: Transparent conductive film
3: Semiconductor layer
4: Sensitizing dye
5: Electrolyte layer
6: Catalyst layer
7: Electrode base material
8: Semiconductor electrode
9: Counter electrode

The invention claimed is:

1. A dye-sensitized photoelectric conversion element comprising in this order:
a porous semiconductor electrode comprising dye-sensitized semiconductor particles;
an electrolyte layer, and
a counter electrode,
wherein the electrolyte layer is an electrolytic solution in which an ammonium ion represented by the following formula (I), an alkali metal perchlorate, and an iodide ion are dissolved in an organic solvent and the ratio of the molar amount of triiodide ions to the molar amount of iodide ions is less than 1%,

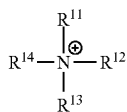

(I)

wherein $R^{11}$ to $R^{14}$ are a hydrogen atom, an alkyl group or an aryl group, and may be the same or different from each other.

2. The dye-sensitized photoelectric conversion element according to claim 1, wherein the electrolytic solution contains a guanidinium ion and a thiocyanate ion or a halide ion.

3. The dye-sensitized photoelectric conversion element according to claim 1, wherein the concentration of the ammonium ion in the electrolytic solution is 0.05 to 5M, the concentration of the alkali metal perchlorate is 0.05 to 5M, and the concentration of the iodide ion is 0.1 to 10M.

4. The dye-sensitized photoelectric conversion element according to claim 1, wherein the electrolytic solution contains a reducing agent.

5. The dye-sensitized photoelectric conversion element according to claim 4, wherein the reducing agent is sodium thiosulfate.

6. A dye-sensitized photoelectric conversion element comprising in this order:

a porous semiconductor electrode comprising dye-sensitized semiconductor particles;
an electrolyte layer, and
a counter electrode,
wherein the electrolyte layer is a gel electrolyte comprising an onium salt of a crosslinking agent represented by the following general formula and poly(4-vinylpyridine), and the electrolytic solution according to claim 1:

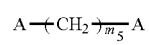

(5)

wherein $m_5$ is an integer of 1 to 30 and A is the following formula (A); in the formula (A), each $R^1$ is independently a fluoro group or an alkyl group or aryl group having a fluoro group, and the alkyl group or the aryl group may have a substituent.

$$-N(SO_2R^1)_2 \qquad (A)$$

7. The dye-sensitized photoelectric conversion element according to claim 1, wherein the alkali metal perchlorate is $LiClO_4$ or $NaClO_4$.

8. The dye-sensitized photoelectric conversion element according to claim 1, a sensitizing dye absorbed into semiconductor particles is one of three primary color dyes.

* * * * *